US012776562B2

(12) United States Patent
LaPalme et al.

(10) Patent No.: US 12,776,562 B2
(45) Date of Patent: Oct. 27, 2026

(54) MOUNTING BRACKETS AND SYSTEMS

(71) Applicant: DISH Wireless L.L.C., Englewood, CO (US)

(72) Inventors: Jerome A. LaPalme, Aurora, CO (US); Greg Ivey, Highlands Ranch, CO (US); Chris Patton, Castle Rock, CO (US)

(73) Assignee: DISH Wireless L.L.C., Englewood, CO (US)

( * ) Notice: Subject to any disclaimer, the term of this patent is extended or adjusted under 35 U.S.C. 154(b) by 224 days.

(21) Appl. No.: 18/636,714

(22) Filed: Apr. 16, 2024

(65) Prior Publication Data

US 2024/0258679 A1 Aug. 1, 2024

Related U.S. Application Data

(63) Continuation of application No. 17/739,808, filed on May 9, 2022, now Pat. No. 11,996,604.

(60) Provisional application No. 63/186,540, filed on May 10, 2021.

(51) Int. Cl.
*H01Q 1/12* (2006.01)
*F16M 13/02* (2006.01)
*H01Q 1/24* (2006.01)

(52) U.S. Cl.
CPC .......... *H01Q 1/1242* (2013.01); *F16M 13/02* (2013.01); *H01Q 1/1228* (2013.01); *H01Q 1/246* (2013.01)

(58) Field of Classification Search
None
See application file for complete search history.

(56) References Cited

U.S. PATENT DOCUMENTS

| | | | | |
|---|---|---|---|---|
| D394,201 | S | 5/1998 | Newell et al. | |
| D457,877 | S | 5/2002 | McDonald et al. | |
| 7,113,144 | B2 | 9/2006 | Lin et al. | |
| D532,412 | S | 11/2006 | Yang | |
| 7,385,564 | B2 | 6/2008 | Zihlman | |
| 7,408,526 | B1 | 8/2008 | Pan | |
| 7,918,425 | B2 | 4/2011 | Rathbone et al. | |
| 8,534,622 | B2 * | 9/2013 | Vanover | H01Q 1/1207 211/171 |

(Continued)

OTHER PUBLICATIONS

Triad EEI Triad Mount, Isometric and Components dated Dec. 31, 2021 (9 pages).

(Continued)

*Primary Examiner* — Crystal L Hammond
(74) *Attorney, Agent, or Firm* — KW Law, LLP

(57) ABSTRACT

A mounting assembly for cellular communication components includes a support mast and a mast bracket with w-shaped geometry. The mast bracket includes a central body defining a groove to receive the support mast. The mast bracket also includes a first support tab extending from the central body opposite the groove in a first direction. The first support tab defines a first slot. A second support tab extends from the central body opposite the groove in the first direction with the second support tab substantially parallel to the first support tab and defining a second slot. A device bracket is coupled to the mast bracket and comprises an elongated body to receive cellular equipment. A third support tab extends from the elongated body opposite the mating surface and defines a fifth slot. A fastener extends through the first slot, the second slot, and the fifth slot.

20 Claims, 6 Drawing Sheets

(56) References Cited

U.S. PATENT DOCUMENTS

| | | | |
|---|---|---|---|
| D730,331 S | 5/2015 | Wong et al. | |
| 9,385,413 B2 * | 7/2016 | Pass | H01Q 1/1207 |
| 9,812,762 B2 | 11/2017 | Skrepcinski et al. | |
| D805,888 S | 12/2017 | De Los Santos | |
| 9,853,346 B2 | 12/2017 | Skrepcinski et al. | |
| 11,417,941 B2 | 8/2022 | Jang et al. | |
| 11,621,548 B2 | 4/2023 | Heath et al. | |
| 11,817,615 B2 | 11/2023 | Campbell et al. | |

OTHER PUBLICATIONS

Triad EEI Triad Mount, Isometric and Components dated Nov. 2, 2020 (9 pages).
Triad EEI Triad Mount, Isometric and Components dated Jan. 24, 2020 (7 pages).

* cited by examiner

MOUNTING BRACKETS AND SYSTEMS

CROSS REFERENCE TO RELATED APPLICATIONS

This application claims priority to U.S. patent application Ser. No. 17/739,808 entitled "MOUNTING BRACKETS AND SYSTEMS" and filed on May 9, 2022, which claims priority to U.S. Provisional Patent Application No. 63/186,540 entitled "APPARATUS, SYSTEM, AND BRACKET FOR MOUNTING A TRANSCEIVER RADIO UNIT TO A COMPONENT OF A CELLULAR COMMUNICATION SYSTEM" and filed on May 10, 2021, both of which are incorporated herein by reference.

TECHNICAL FIELD

Embodiments of the subject matter described herein relate generally to brackets used to mount components in a cellular communications system. For example, embodiments of the disclosed mounting apparatus can mount a radio transceiver unit of a cellular base station to a mast or other support structure.

BACKGROUND

Radio communication equipment is deployed in many different field locations to support communication over vast territories on cellular frequencies. Cellular communication towers often include arrays of radio equipment. The radio equipment is relatively bulky, and the large footprint of individual components is amplified by the arrangement of the equipment facing in different directions. If the arrays of equipment get too large, they can put stress on the support structures or outgrow rigid covers commonly used to protect equipment deployed at cellular base stations.

Different base stations are built using support structures of different sizes and arrangements. For example, support poles installed at different sites may have different diameters or heights. Support poles with different diameters can use different mounting hardware made specifically for each diameter. Field technicians may thus carry multiple different racking solutions to interface with different support structures at different job sites.

SUMMARY

Various embodiments mount radio equipment in compact arrangements suitable for field deployment in a cellular communications system. A cellular communication assembly includes a support mast having a first diameter, and a mast bracket having a w-shaped geometry. The mast bracket is coupled to the support mast and includes a central body defining a groove to receive the support mast. The mast bracket also includes a first support tab extending from the central body opposite the groove in a first direction with the first support tab defining a first slot. The mast bracket further includes a second support tab extending from the central body opposite the groove in the first direction with the second support tab substantially parallel to the first support tab and defining a second slot. A device bracket is coupled to the mast bracket, the device bracket and comprises an elongated body defining a third slot through a first end of a mating surface of the elongated body. The elongated body defines a fourth slot through a second end of the mating surface opposite the first end. A third support tab extends from the elongated body opposite the mating surface and defines a fifth slot. A fastener is disposed through the first slot, the second slot, and the fifth slot.

In various embodiments, a transceiver radio unit is coupled adjacent to the mating surface of the device bracket. A second fastener extends through the third slot and into the transceiver radio unit. A third fastener extends through the fourth slot and into the transceiver radio unit. The mast bracket may include a first weld joint between the central body and the first support tab. A second weld joint may be located between the central body and the first support tab. The central body of the mast bracket defines a first opening through a first distal and of the mast bracket and a second opening through a second distal and of the mast bracket. A spacer is disposed between the first support tab and the second support tab with the first fastener extending through the spacer. The device bracket is formed by stamping a sheet of metal and bending the third support tab orthogonal to the elongated body. The third slot and the fourth slot define a minimum mounting pitch and a maximum mounting pitch. The first fastener translates within the first slot, the second slot, and the fifth slot to adjust a position of the mating surface.

A mounting assembly according to various embodiments comprises a mast bracket having a w-shaped geometry. The mast bracket further includes a central body defining a groove configured to receive a support mast. The mast bracket also includes a first support tab extending from the central body opposite the groove in a first direction. The first support tab defines a first slot. The mast bracket also has a second support tab extending from the central body opposite the groove in the first direction. The second support tab is substantially parallel to the first support tab and defines a second slot. A spacer is disposed between the first support tab and the second support tab, the spacer defining a passage. A fastener extends through the first slot, the second slot, and the passage.

In various embodiments, a device bracket is coupled to the mast bracket. The device bracket may include an elongated body defining a third slot through a first end of a mating surface of the elongated body. The elongated body also defines a fourth slot through a second end of the mating surface opposite the first end. A third support tab extends from the elongated body opposite the mating surface. The third support tab defines a fifth slot with the first fastener extending through the fifth slot.

In some embodiments, the mast bracket includes a first weld joint between the central body and the first support tab and a second weld joint between the central body and the first support tab. The central body of the mast bracket may define a first opening through a first end of the mast bracket and a second opening through a second end of the mast bracket. The first fastener translates along the first slot and the second slot to adjust a position of the fastener relative to the central body. The spacer contacts the first support tab and the second support tab. The first support tab is pressed between a head of the first fastener and the spacer. The second support tab is pressed between a nut of the first fastener and the spacer.

A mast bracket of the present disclosure is also described herein. The mast bracket includes a central body with a w-shaped geometry that defines a central groove. The central groove is shaped to receive a support mast. A first support tab extends from the central body opposite the groove in a first direction, the first support tab defining a first slot. A second support tab extends from the central body opposite the groove in the first direction. The second support tab is substantially parallel to the first support tab and defines a second slot.

In some embodiment, A spacer is disposed between the first support tab and the second support tab. The spacer defines a passage. A fastener extends through the first slot, the passage, and the second slot. The fastener may translate along the first slot and the second slot to adjust a position of the fastener and the spacer relative to the central body.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
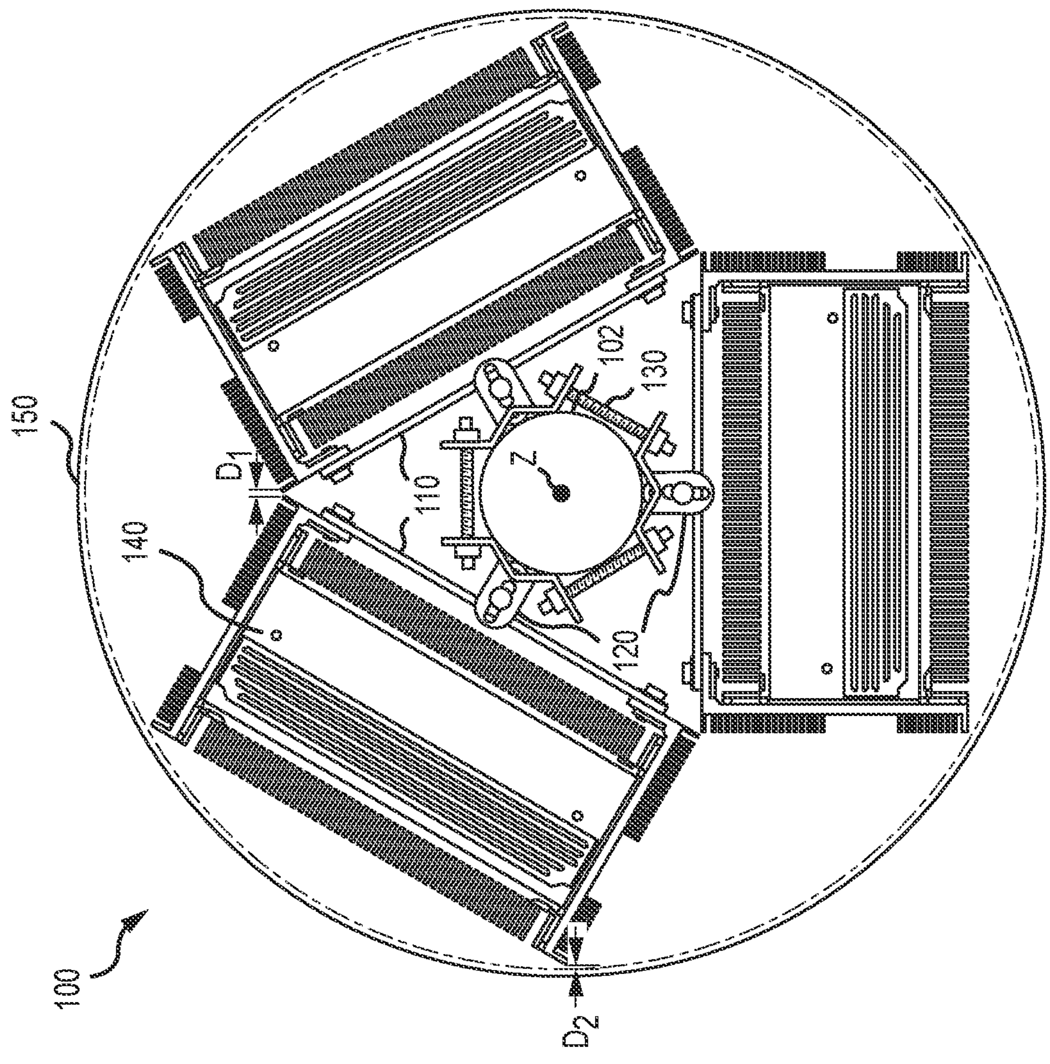
FIG. 1 illustrates a top view of an exemplary system that includes three transceiver radio units mounted to a support mast using a mounting assembly.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description. It should be understood that various aspects disclosed herein may be combined in different ways than the arrangements specifically presented in the description and accompanying drawings.

Certain terminology may be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second", and other such numerical terms referring to structures do not imply a sequence or order unless clearly indicated by the context.

The present disclosure relates to a mounting kit that facilitates mounting of a first component (e.g., the mounted component) to a second component (e.g., the supporting component). Embodiments of the mounting kit can be designed and configured to accommodate mounting of various types of components to various types of support structures. In accordance with the non-limiting examples shown and described here, the mounting apparatus accommodates mounting a transceiver radio unit (RU) of a cellular communication system to an appropriate support structure, such as an antenna structure (e.g., a support mast) of the cellular communication system. It should be appreciated that embodiments of the mounting apparatus can be specifically designed for compatibility with other applications, deployments, mountable components, and support structures.

As shown in the figures, the mounting kit includes a support mast bracket that attaches to the support mast, and a device bracket that attaches to the device (e.g., an RU). Each RU is mounted to the mast using multiple mounting kits (e.g., one at or near the top of the RU and one at or near the bottom of the RU). The embodiments depicted in the figures are suitably configured to accommodate the mounting of three RUs around the circumference of the support mast. It should be appreciated that the mounting kit can be modified as needed to accommodate the mounting of more or fewer than three RUs, to be compatible with different sized support masts, to be compatible with different support mast shapes, to be compatible with different device configurations (e.g., RU implementations), and the like.

Referring now to FIG. 1, an example system 100 (e.g., a cellular communication assembly) is shown with three devices 140 (e.g., RUs) mounted to a support mast 102 using mounting assemblies. The support mast 102 is shown in cross section central to three mast brackets 120. As depicted, support mast 102 defines a mounting axis Z coming out of the page. A housing 150 surrounds system 100 and is oriented with a distance D2 between the interior surface of housing 150 and the outer corner of an RU 140.

Mast brackets 120 are arranged in a triangular formation about support mast 102. Fastener assemblies 130 join the mast brackets 120 to adjacent mast brackets. The fastener assemblies are arranged tangential to support mast 102 and pull on mast brackets 120, thereby causing mast brackets 120 to press radially inwards against support mast 102. Friction between mast bracket 120 and support mast 102 may tend to retain mast bracket 120 in position along mounting axis Z.

Each mounting assembly includes a device bracket 110 that is coupled to a mast bracket 120. Device bracket 110 is fastened to RU 140 with a mating surface of device bracket 110 facing radially outward. Device bracket 110 is also fixed to mast bracket 120. Each RU 140 in system 100 may have a spacing distance $D_1$ from adjacent RU 140. Device bracket is translatable radially inwards or outwards from mounting axis Z to adjust distance $D_1$ between adjacent RUs 140 or distance $D_2$ between an RU 140 and housing 150.

Figure 2:
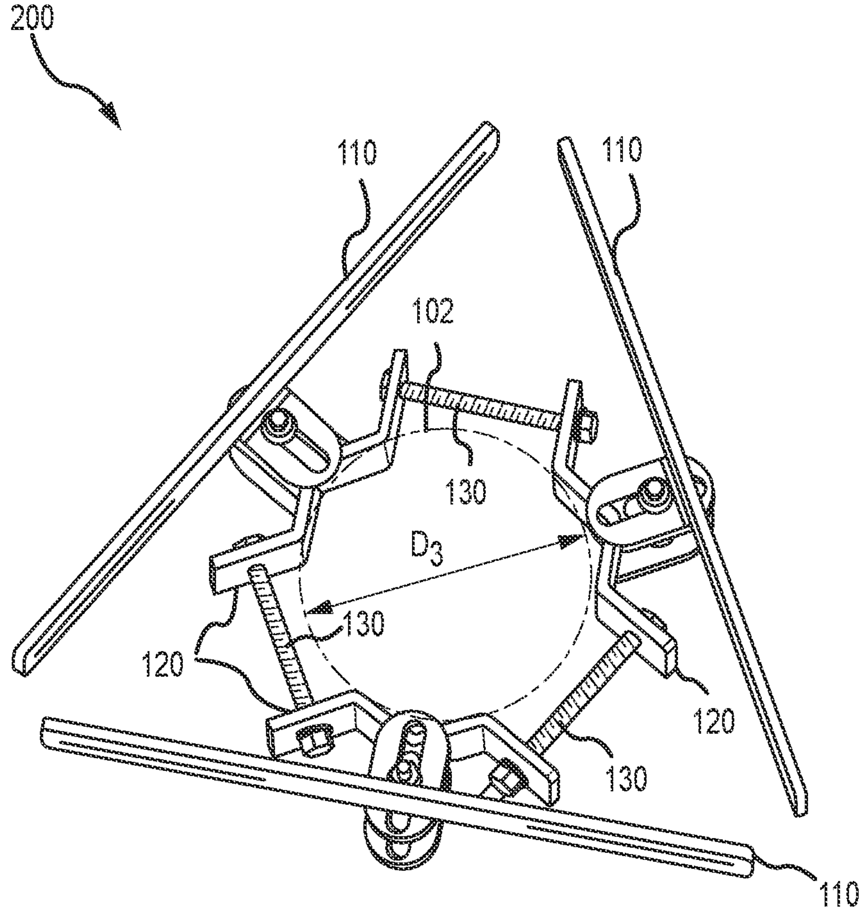
FIG. 2 illustrates a perspective view of an example mounting assembly having three mounting kits.

Referring now to FIG. 2, a mounting assembly 200 is shown according to various embodiments. Mounting assembly 200 includes three mast brackets 120 arranged about support mast 102 having a diameter $D_3$. Diameter $D_3$ may be, for example, 3 inches, 4 inches, 5 inches, 6 inches, 7 inches, 8 inches, 9 inches, 10 inches, 11 inches, 12 inches, or any other diameter suitable for supporting cellular tower installations.

Mounting assembly 200 may be mountable on support masts 102 of different diameters $D_3$ by using different lengths of fastener assembly 130. Shorter fastener assemblies 130 or fastener assemblies 130 threaded deeper onto the bolt body tend to pull mast brackets 120 towards support mast 102. Mast brackets 120 will press against an outer surface of support mast 102. Each device bracket 110 may slide inward towards or outward from mast bracket 120 to adjust the position of device bracket 110 relative to support mast 102. Device brackets 110 can thus be positioned to adjust, reduce, or increase distance $D_1$ or distance $D_2$ (both of FIG. 1). The various components of mounting assembly 200 may be made from metals or alloys such as, for example, steel, iron, aluminum, titanium, or other suitable metals or alloys.

Figure 3:
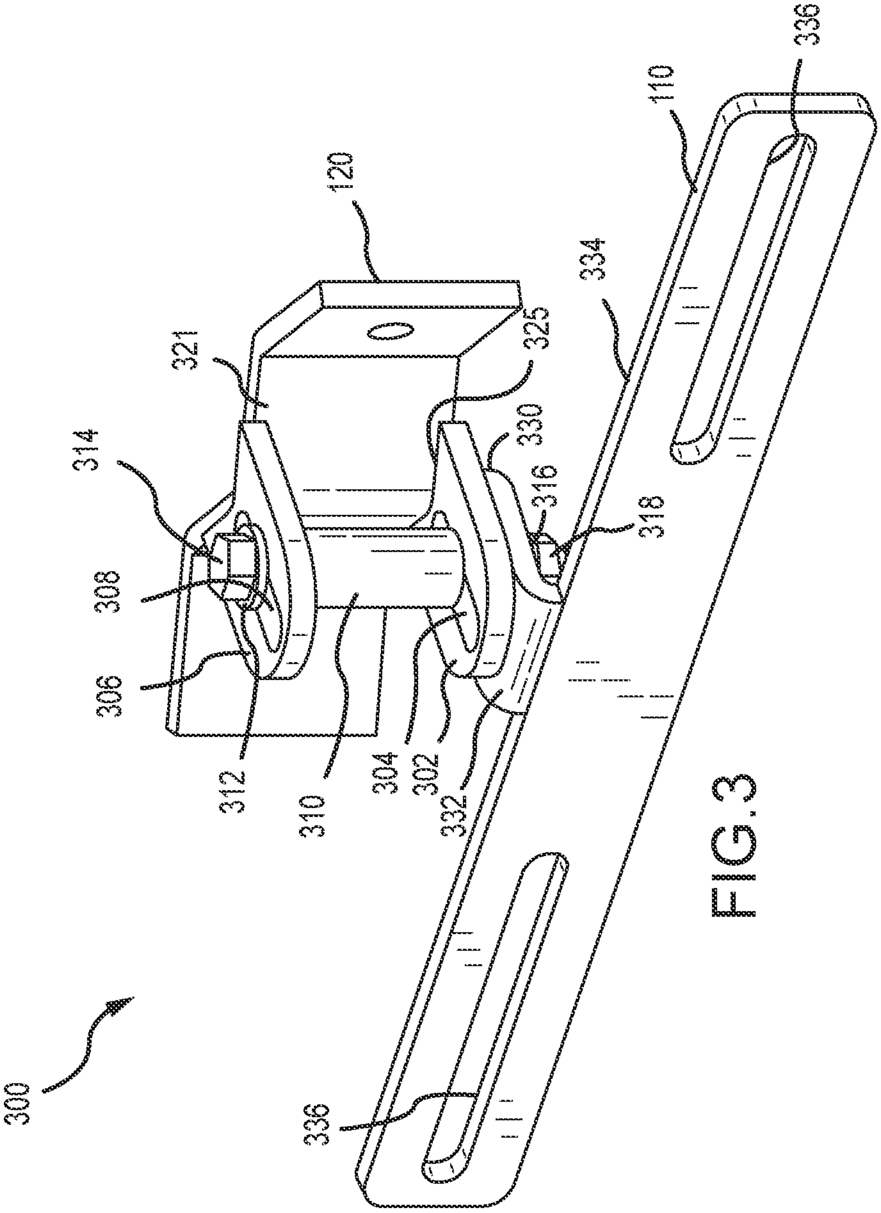
FIG. 3 illustrates a perspective view of an example mounting kit.

Referring now to FIG. 3, a mounting kit 300 is shown according to various embodiments. Mounting assembly 200 of FIG. 2 comprises multiple mounting kits 300. Mounting kit 300 includes a device bracket 110 coupled to mast bracket 120. Mast bracket 120 includes body 321 having a w-shaped profile or geometry. Mounting tab 306 extends from a central portion of body 321. The central portion may be identified by the central peak of the w-shaped profile. Mounting tab 306 may define a mounting slot 308 that is elongated in a direction extending away from body 321.

Mounting tab 302 also extend from the central portion of body 321. Mounting tab 302 may be substantially parallel to mounting tab 306. Mounting tab 302 may define a slot 304 aligned with slot 308. Fastener 314 extends through slot 308 and slot 304 and into nut 318. Mounting tabs 302 and 306 may be welded to body 321 with weld joint 325 in some embodiments, though mounting tab 306 may also be formed integrally with body 321 and bent into position.

Spacer 310 is disposed between mounting tab 306 and mounting tab 302. Fastener 314 is installable through a passage defined through spacer 310. The passage defined through spacer 310 may have a circular cross section such that spacer 310 has the shape of a bored cylinder. Spacer 310 may contact or press against mounting tab 306 and mounting tab 302 in an installed configuration with fastener 314 threaded into nut 316. Spacer 310 may tend to resist deformative forces applied at mounting tabs 302 and 306.

Fastener 314 exerts a compressive force pressing mounting tab 302 towards mounting tab 306. Spacer 310 may enhance rigidity of mounting kit 300 by pressing outwards against mounting tab 302 and mounting tab 306 in opposition to the compressive force exerted by fastener 314. Spacer 310 tend to resist deformation at mounting tabs 302 and 306 of mast bracket 120 in response to heavy loads applied on device bracket 110. The tensioned fastening arrangement described herein also tends to retain installed device bracket 110 in a desired position relative to the supporting mast bracket 120.

Device bracket 110 includes a mounting tab 330 extending from body 334. Mounting tab 330 may be formed integrally with body 334 using a stamping process, for example, and coupled with a bend joint 332. Mounting tab 330 may also be welded to body 334. Mounting tab 330 lays flush against a mounting tab 302 or 306 when installed. In the example of FIG. 3, mounting tab 330 lays flush against an outer surface of mounting tab 302. Mounting tab 330 may also lay flush against mounting tab 306 in other embodiments and may be arranged against inside or outside surfaces of mounting tabs 302 and 306. The length of spacer 310 may be shortened to accommodate interior mounting arrangements with mounting tab 330 of device bracket 110 disposed between mounting tabs 302 and 306 of mast bracket 120.

Fastener 314 extends through device bracket 110. Fastener 314 may tend to compress mounting tab 330 of device bracket 110, mounting tab 302 of mast bracket 120, spacer 310, mounting tab 306 of mast bracket 120, and a washer 312. Device bracket 110 can pivot relative to mast bracket 120 about fastener 314. Device bracket 110 may also translate body 334 defining mounting slots 336 relative to mast bracket 120 by adjusting the position of fastener 314 in slots defined through mounting tabs 302 and 306 and through a slot of mounting tab 330.

Figure 4:
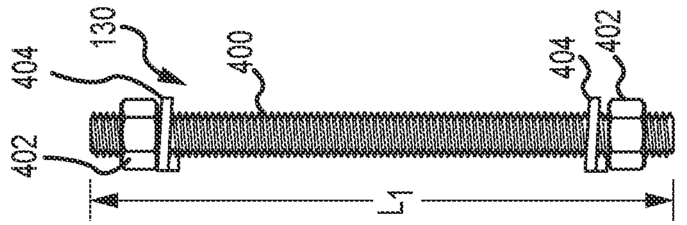
FIG. 4 illustrates a side view of an example fastener assembly for use with a mounting kit.

Referring now to FIG. 4, a fastener assembly 130 is shown. Fastener assembly 130 may comprise washers 404 and nuts 402 threaded onto a threaded stud 400. Washers may be standard washers, lock washers, or may be omitted in some embodiments. Referring briefly to FIG. 2 with continued reference to FIG. 4, threaded stud 400 may be field cut to a desired length $L_1$ during installation of mounting assembly 200. Nuts 402 may be rotated until they rest in a desired position on threaded stud 400, exerting force against mast brackets 120. The location of nuts 402 on threaded stud 400 may control the distance between adjacent mast brackets 120 of mounting assembly 200. Tension applied to mast brackets 120 through fastener assemblies 130 tends to retain mounting assembly 200 in place on support mast 102.

Figure 5:
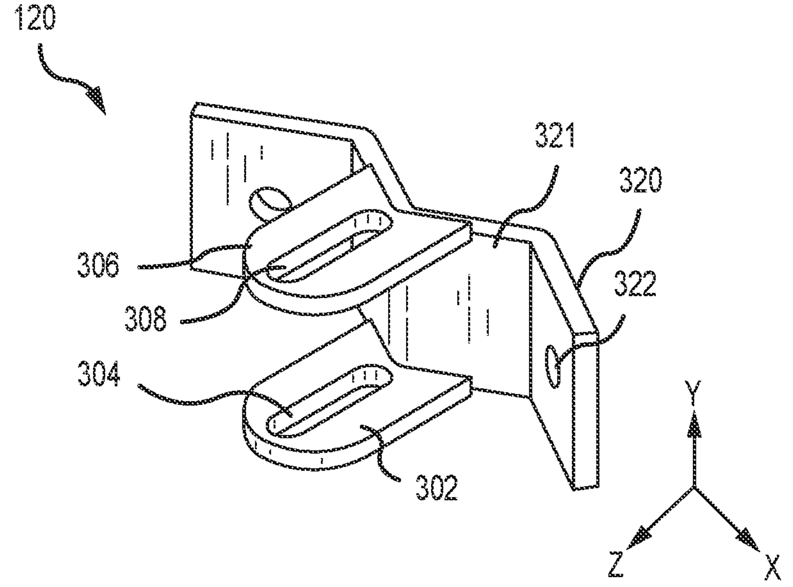
FIG. 5 is a perspective view of an example mast bracket from a mounting kit.
Figure 6:
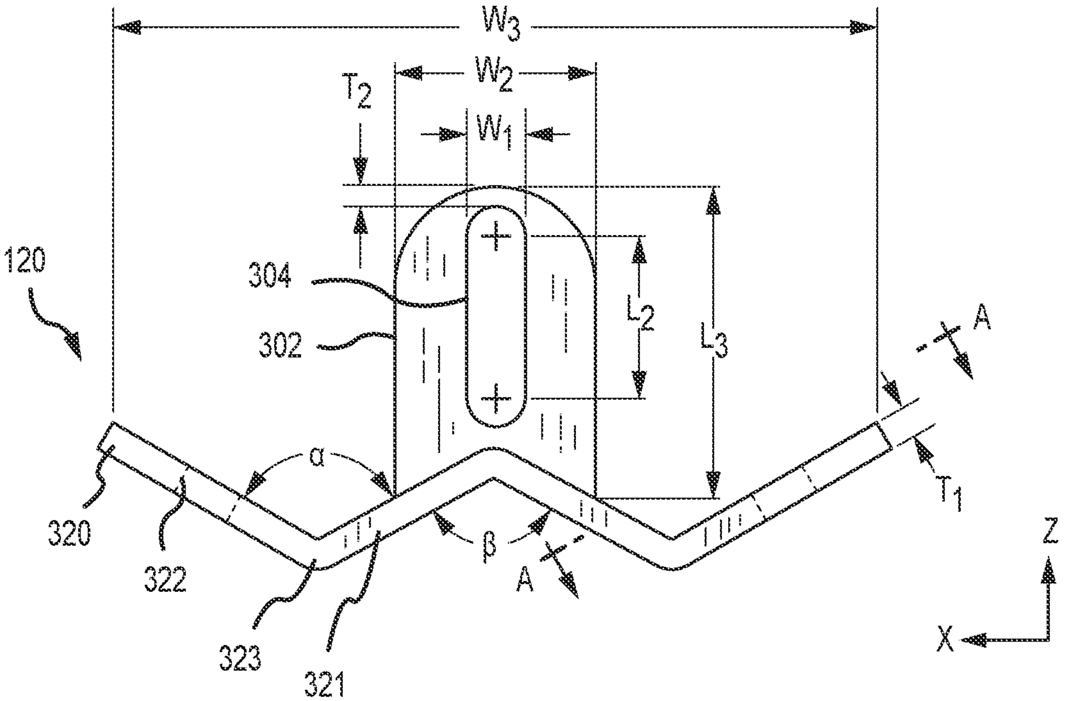
FIG. 6 illustrates a top view of the example mast bracket.

Referring now to FIGS. 5 and 6, an example mast bracket 120 is shown according to various embodiments. Mast bracket 120 includes mounting tab 306 and mounting tab 302 extending from body 321 in the z direction. Mounting tabs 302 and 306 are formed in a z-x plane, while the body is formed in multiple planes each having a component in the y direction. In that regard, mounting tabs 302 and 306 may be substantially perpendicular or substantially orthogonal to body 321.

Mounting flange 320 extends from body 321 of mast bracket 120 and defines opening 322. Opening 322 may be circular to receive a threaded stud 400 or other fasteners. Fastener assembly 130 may pass through opening 322 with nut 402 or washer 404 engaging mounting flange 320 to pull mounting flange 320 towards the mounting flange of an adjacent mast bracket 120.

In some embodiments, mounting flange 320 is formed integrally with body 321 and has bend 323 connecting mounting flange 320 to body 321. Mounting flange 320 meets body 321 at an angle $\alpha$. Body 321 includes a central groove defined by a bend having angle $\beta$ at a central portion of body 321. The peak formed by body 321 at angle $\beta$ aligns with mounting slot 304 of mounting tab 302. Mounting tab 302 and slot 304 may thus bisect angle $\beta$ in some embodiments.

Slots 304 and 308 support various mounting points along a length $L_2$ in the z direction between a most inboard and a most outboard mounting position relative to body 321. Length $L_2$ may be, for example, approximately 1 inch, 1.25 inches, 1.5 inches, 1.75 inches, 2.0 inches, or 2.5 inches. As used herein with linear measurements of distance, approximately signifies a range between +/−10%, +/−20%, +/−30%, +/−40%, or +/−50% about the stated measurement of distance.

Slots 304 and 308 have a width $W_1$ to accept fasteners having a diameter less than or equal to $W_1$. Width $W_1$ may be approximately 0.3 inches, 0.4 inches, 0.5 inches, 0.6 inches, or 0.7 inches. For example, width $W_1$ could be 0.438 in to receive a fastener ⅜ inch fastener. Width $W_1$ may thus be selected to interface with a suitable or desired fastener of a matching diameter.

Mounting tabs 302 and 306 have a length $L_3$ in the Z direction extending from body 321 along an outer perimeter. For example, length $L_3$ may be approximately 1.5 inches, 1.75 inches, 2 inches, 2.25 inches, 2.5 inches, 2.75 inches, or 3 inches. In one embodiment, length $L_3$ is 2.35 inches. Length $L_3$ may be selected to support adjustable mounting positions for RU 140. Longer lengths $L_3$ may tend to support a greater range of mounting positions, with positions farther from body 321 tending to increase stress placed on mast bracket 120.

Mounting tabs 302 and 306 also have a width $W_2$ in the x direction. Width $W_2$ may be, for example, approximately 1 inch, 1.25 inches, 1.5 inches, 1.75 inches, or 2 inches. Width $W_2$ is 1.5 inches in an example embodiment.

Body 321 has a width $W_3$ in the x direction. Mast brackets 120 having longer width $W_3$ tend to support greater diameters of support mast 102. Mast brackets 120 having shorter width $W_3$ tend to support smaller diameters of support mast 102. Width $W_3$ may be, for example, approximately 4 inches, 4.5 inches, 5 inches, 5.5 inches, or 6 inches. In an example embodiment length $W_3$ is 5.7 inches.

Mounting tabs 302 and 306 maintain a thickness $T_2$ at a thin section to support structural integrity of the mounting tabs. Thickness $T_2$ may by, for example, approximately 0.1 inches, 0.15 inches, 0.2 inches, 0.25 inches, or 0.3 inches. In an example embodiment, Thickness $T_2$ is 0.16 inches.

Body 321 and mounting tabs have a thickness $T_1$. Thickness $T_1$ may be selected to achieve desired strength and weight characteristics in mast bracket 120. Thickness $T_1$ corresponds to a thickness of sheet metal used to form mast bracket 120 in some embodiments formed using a stamping process. For example, Thickness $T_1$ may be approximately 0.15 inches, 0.2 inches, 0.25 inches, 0.3 inches, 0.35 inches, or any other desired thickness. In an example embodiment, $T_1$ may be ¼ inch.

Figure 6A:
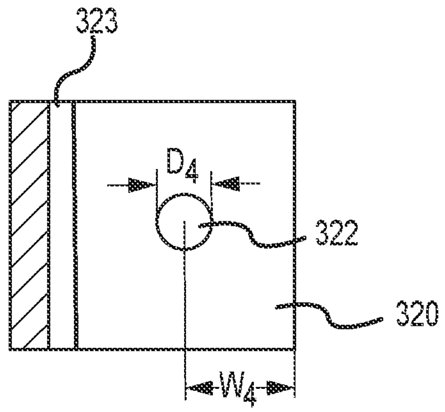
FIG. 6A illustrates a cross-sectional view of the example mast bracket of FIG. 6 viewed from line A-A.

With reference to FIG. 6A, mast bracket 120 is shown as viewed in cross section from line A-A of FIG. 6. Opening 322 defined through mounting flange 320 has a diameter $D_4$. Diameter $D_4$ may be selected to accept fastener assembly 130. Diameter $D_4$ may be approximately 0.3 inches, 0.4 inches, 0.5 inches, 0.6 inches, or 0.7 inches. In an example embodiment, diameter $D_4$ may be 0.438 inches to receive a ⅜ inch fastener.

Opening 322 may be located a width $W_4$ on center from the distal end of mounting flange 320. Width $W_4$ may be, for example, approximately 0.6 inches, 0.7 inches, 0.8 inches, 0.9 inches, 1 inch, or any other suitable width. In some embodiments, width $W_4$ is half of the length of mounting flange 320 in the same direction. In that regard, opening 322 may be centered on mounting flange 320. In an example embodiment, width $W_4$ is 0.875 inches.

Figure 7:
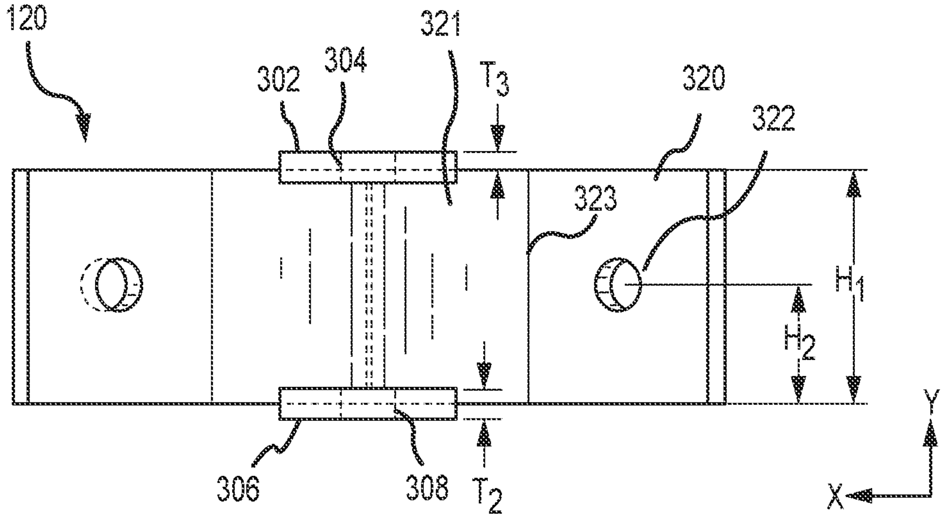
FIG. 7 illustrates an elevation view of the example mast bracket.

Turning now to FIG. 7, mast bracket 120 is shown in an elevation view. Mounting tabs 302 and 306 have a thickness $T_2$. Mounting tabs 302 and 306 may be cut or stamped from the same sheet metal as body 321 in some embodiments. In that regard, thickness $T_2$ may be the same as or similar to thickness $T_1$. Thickness $T_2$ may be approximately 0.15 inches, 0.2 inches, 0.25 inches, 0.3 inches, 0.35 inches, or any other desired thickness. Slots 304 and 308 formed through mounting tabs 302 and 306, respectively, may be centered relative to body 321 in the x direction.

Mounting tabs 302 and 306 also extend beyond a surface of body 321 by a protruding thickness $T_3$. Protruding thickness $T_3$ may be approximately half of thickness $T_2$. Protruding thickness $T_3$ may be approximately 0.1 inches, 0.15 inches, 0.2 inches, 0.25 inches, 0.3 inches, or any other desired thickness. Protruding thickness may also be zero or near zero for mounting tabs 302 and 306 aligned flush with body 321. Mounting tabs 302 and 306 may also be sunk relative to the outer surfaces of body 321 in the y direction. In an example embodiment, thickness $T_1$ is ¼ inch and thickness $T_2$ is ⅛ inch.

The central body 321 and mounting flange 320 of mast bracket 120 have a height $H_1$ in the y direction. $H_1$ is substantially uniform across the length of central body 321 in the x direction in various embodiments, though height $H_1$ could vary across the length of body 321 in the x direction in other embodiments. Height $H_1$ may be, for example, approximately 1.5 inches, 1.75 inches, 2 inches, 2.25 inches, 2.5 inches, or any other suitable height.

Opening 322 is formed through mounting flange 320 at a height $H_2$ from an edge of mounting flange 320. Height $H_2$ may be approximately half of height $H_1$. In that regard, opening 322 may be centered on mounting flange 320 in the y direction. In another example, $H_2$ may be approximately 0.75 inches, 1 inch, 1.25 inches, or 1.5 inches. In one example embodiment, $H_1$ is 2 inches and $H_2$ is 1 inch.

Figure 8:
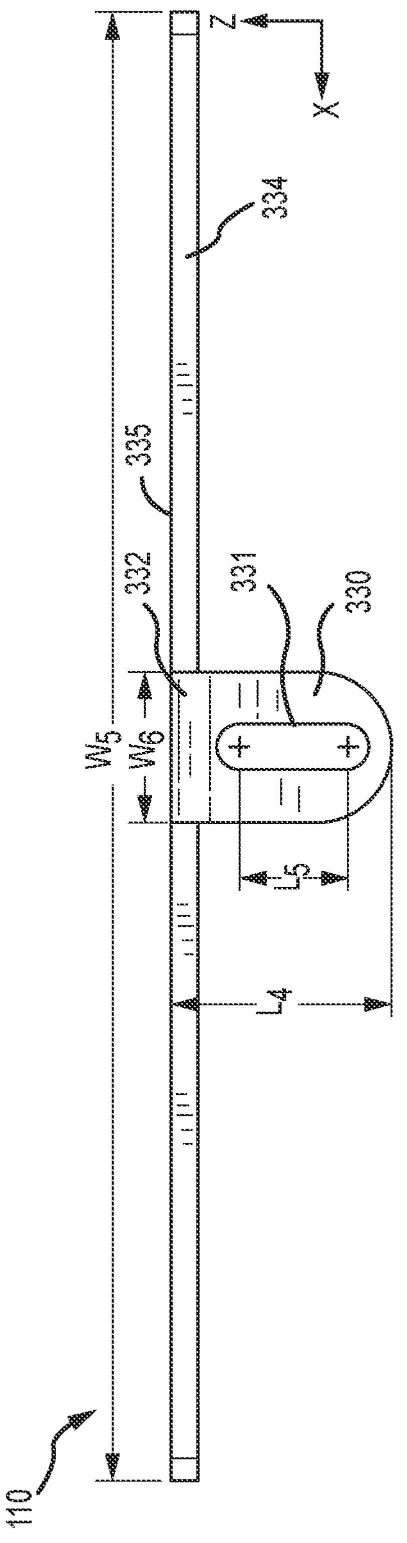
FIG. 8 illustrates a top view of an example device bracket for use in a mounting kit.
Figure 9:
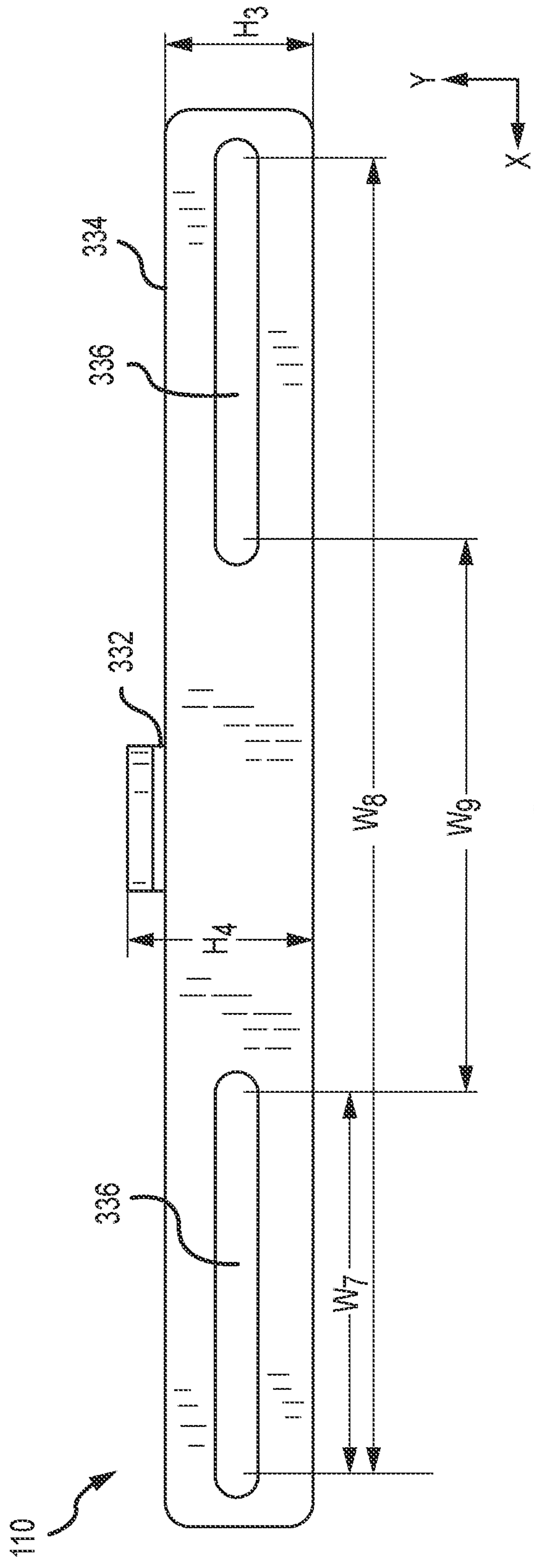
FIG. 9 illustrates an elevation view of the example device bracket.

Referring now to FIGS. 8 and 9, device bracket 110 is shown for use in mounting assembly 200 or mounting kit 300, in accordance with various embodiments. Device bracket 110 has a mounting tab 330 that defines slot 331. Slot 331 in mounting tab 330 may be the same as or similar to slots 304 and 308 in mounting tabs 302 and 306. Slot 331 is shaped to receive a fastener that retains tab 330 adjacent to at least one of tab 302 or tab 306. In an example embodiment, slot 331 is sized to receive a ⅜ inch fastener.

The position of device bracket 110 relative to support mast 102 and mast bracket 120 may be adjusted by translating the device bracket or rotating the device bracket relative to a fastener disposed through slot 331 and at least one of slots 304 and 308. Mounting tab 330 may be coupled to body 334 by a bend joint 332. Device bracket 110 may be formed by stamping sheet metal and bending mounting tab 330 into position. A mounting surface 335 of device bracket 110 is disposed opposite tab 330 and configured to support a mounted device 140.

Slot 331 has a length $L_5$ in the z direction, and mounting tab 330 has a length La in the z direction. Length $L_5$ may be selected to allow a desired level of adjustability in mounting assembly 200 or mounting kit 300. $L_5$ is shorter than $L_4$ with slot 331 completely enclosed by mounting tab 330. For example, $L_5$ may be approximately 0.7 inches, 0.9 inches, 1 inch, 1.1 inches, 1.2 inches, or any other suitable length. Length La may be approximately 1.5 inches, 1.75 inches, 2 inches, 2.25 inches, 2.5 inches, or any other desired length. In an example embodiment, $L_5$ is approximately 1.1 inches and $L_4$ is approximately 2.2 inches.

Body 334 of bracket 110 has a width $W_5$ in the x direction. Width $W_5$ may be, for example, approximately 13 inches, 14 inches, 15 inches, 16 inches, 17 inches, 18 inches, or any other suitable length for supporting device 140 (e.g., an RU). In an example embodiment, width $W_5$ is 14.6 inches. Device bracket 110 may be symmetric in some embodiments with mounting tab 330 centered along width $W_5$ of body 334.

Mounting tab 330 has a width $W_6$ in the x direction. Width $W_6$ may be, for example, 1 inch, 1.25 inches, 1.5 inches, 1.75 inches, 2 inches, or any other suitable width for removably fixing device bracket 110 to mast bracket 120. In an example embodiment, width $W_6$ is 1.5 inches. Greater widths of mounting tab 330 may tend to increase rigidity of device bracket 110.

Device bracket 110 includes body 334 defining mounting slots 336. Mounting slots 336 may be substantially symmetric and may be suitable for receiving fasteners. Fasteners may pass through slots 336 into device 140 (e.g., an RU). A device mounted to body 334 of device bracket 110 may be moveable by translating fasteners in slots 336 in the x direction. Slots 336 have a width $W_7$ to support fasteners located at various positions along slots 336 in the x direction. Width $W_7$ may be, for example, approximately 3 inches, 3.5 inches, 4 inches, 4.5 inches, or 5 inches. In an example embodiment, width $W_7$ is 3.9 inches.

Device bracket 110 defines a maximum mounting pitch of width $W_8$ based on the widest (i.e., most outboard) fastener positions supported by slots 336. Width $W_8$ may be, for example, approximately 12 inches, 13 inches, 14 inches, 15 inches, 16 inches, or any other suitable mounting pitch. In an example embodiment, $W_8$ is 13.6 inches.

Device bracket 110 defines a minimum mounting pitch of width $W_9$ based on the narrowest (i.e., most inboard) fastener positions in the x direction supported by slots 336. Width $W_9$ may be, for example, approximately 4 inches, 5 inches, 6 inches, 7 inches, or any other suitable length. In an example embodiment, $W_9$ is 5.7 inches. Device bracket 110 may receive fasteners at any point in slots 336 to allow for various mounting pitches between the minimum and maximum pitches.

Body 334 of device bracket 110 has a height $H_3$ in the y direction. Height $H_3$ may be selected to impart suitable strength and mounting surface area to device bracket 110. Height $H_3$ may be, for example, approximately 1 inch, 1.25 inches, 1.5 inches, 1.75 inches, 2.0 inches, or 2.5 inches. In an example embodiment, height $H_3$ is 1.5 inches. Slots 336 may be centered along height $H_3$ of body 334 in the y direction.

Mounting assemblies of the present disclosure support mounted devices with enhanced adjustability while maintaining suitable load capacity. Referring back to FIG. 3 with continued reference to FIGS. 8 and 9, the position of device bracket 110 may pivot as mounting tab 330 rotates about fastener 314 extending through slot 331. The position of device bracket 110 may translate as mounting tab 330 translates relative to fastener 314 extending through slot 331.

Referring briefly to FIGS. 3 and 5, mounting tabs 302 and 306 of mast bracket 120 may also translate relative to fastener 314 extending through slots 304 and 308. Mounting tabs 302 and 306 with spacer 310 disposed between and contacting both tabs tend to resist deformation in response to a load applied to device bracket 110 in the y direction. Multiple mounting kits 300 may be used to mount a single device 140 for increased support. For example, in FIG. 1, the mounting system depicted may include a second device bracket coupled to each RU 140 offset along the z axis (e.g., into or out of the page). Various embodiments of the present disclosure may thus tend to increase adjustability of cellular mounting assemblies while maintaining load capacities suitable for mounting cellular components.

Benefits, other advantages, and solutions to problems have been described herein with regard to specific embodiments. Furthermore, the connecting lines shown in the various figures contained herein are intended to represent exemplary functional relationships or couplings between the various elements. It should be noted that many alternative or additional functional relationships or connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the invention is accordingly to be limited by nothing other than the appended claims, in which reference to an element in the singular is not intended to mean "one and only one" unless explicitly so stated, but rather "one or more." Moreover, where a phrase similar to "A, B, or C" is used herein, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or device that comprises a list of elements does not include only those elements but may include other elements not expressly listed or inherent to such process, method, article, or device.

The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A cellular communication assembly comprising:
- a support mast having a first diameter;
- a mast bracket coupled to the support mast, the mast bracket comprising:
  - a central body including a w-shaped geometry and defining a central a groove;
  - a first support tab coupled directly to and extending from the central body opposite the groove, the first support tab defining a first elongated slot; and
  - a second support tab coupled directly to and extending from the central body opposite the groove, the second support tab substantially parallel to the first support tab and defining a second elongated slot; and
- a device bracket coupled to the mast bracket.

2. The cellular communication assembly of claim 1, wherein the mast bracket further comprises:
- a first weld joint coupling the central body directly to the first support tab, the first weld joint contacting a central peak of the w-shaped geometry; and
- a second weld joint coupling the central body directly to the second support tab, the second weld joint contacting the central peak of the w-shaped geometry.

3. The cellular communication assembly of claim 1, wherein the central body of the mast bracket defines a first opening through a first end of the mast bracket and a second opening through a second end of the mast bracket opposite the first end.

4. The cellular communication assembly of claim 3, further comprising a spacer disposed between the first support tab and the second support tab with a fastener extending through the spacer, the fastener configured to slideably engage the first and second elongated slots.

5. The cellular communication assembly of claim 1, wherein the device bracket is formed by stamping a sheet of metal and bending a third support tab of the device bracket orthogonal to an elongated body of the device bracket.

6. The cellular communication assembly of claim 1, wherein the device bracket defines a third slot and a fourth slot having a minimum mounting pitch and a maximum mounting pitch.

7. The cellular communication assembly of claim 1, wherein the device bracket defines a third slot in a third support tab, wherein a fastener translates within the first elongated slot, the second elongated slot, and the third slot to adjust a position of the device bracket.

8. A mounting assembly comprising:

a mast bracket having a w-shaped geometry and comprising:

a central body including the w-shaped geometry and defining a central a groove;

a first support tab coupled directly to and extending from the central body opposite a central peak of the groove, the first support tab defining a first elongated slot; and a second support tab coupled directly to and extending from the central body opposite the central peak of the groove, the second support tab substantially parallel to the first support tab and defining a second elongated slot;

a spacer disposed between the first support tab and the second support tab; and a fastener extending through the spacer.

9. The mounting assembly of claim 8, further comprising a device bracket coupled to the mast bracket.

10. The mounting assembly of claim 9, wherein the device bracket comprises:

an elongated body defining a third slot through a first end of a mating surface of the elongated body, the elongated body defining a fourth slot through a second end of the mating surface opposite the first end; and a third support tab extending from the elongated body opposite the mating surface.

11. The mounting assembly of claim 8, wherein the mast bracket further comprises:

a first weld joint between the central body and the first support tab; and a second weld joint between the central body and the first support tab.

12. The mounting assembly of claim 8, wherein the fastener translates along the first elongated slot and the second elongated slot to adjust a position of the fastener relative to the central body.

13. The mounting assembly of claim 8, wherein the first support tab is pressed between a head of the fastener and the spacer.

14. A bracket, comprising:

a central body including a w-shaped geometry and defining a central a groove;

a first support tab coupled directly to and extending from the central body opposite the groove, the first support tab defining a first elongated slot; and a second support tab coupled directly to and extending from the central body opposite the groove, the second support tab substantially parallel to the first support tab and defining a second elongated slot.

15. The bracket of claim 14, further comprising a spacer disposed between the first support tab and the second support tab, the spacer defining a passage.

16. The bracket of claim 15, further comprising a fastener extending through the first elongated slot, the passage, and the elongated second slot.

17. The bracket of claim 16, wherein the fastener translates along the first elongated slot and the second elongated slot to adjust a position of the fastener and the spacer relative to the central body.

18. The bracket of claim 16, wherein the first support tab is pressed between a head of the fastener and the spacer.

19. The bracket of claim 18, wherein the second support tab is pressed between a nut of the fastener and the spacer.

20. The bracket of claim 18, wherein a first length of the first elongated slot is greater than a first width of the first elongated slot, and wherein a second length of the second elongated slot is greater than a second width of the second elongated slot.

* * * * *